United States Patent
Matsumoto et al.

(10) Patent No.: US 7,235,158 B2
(45) Date of Patent: Jun. 26, 2007

(54) PERFORATED TRAY COLUMN WITHOUT DOWNCOMER

(75) Inventors: Yukihiro Matsumoto, Kobe (JP);
Kazuhiko Sakamoto, Himeji (JP);
Kenji Sanada, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 55 days.

(21) Appl. No.: 10/198,433

(22) Filed: Jul. 17, 2002

(65) Prior Publication Data

US 2003/0019737 A1   Jan. 30, 2003

(30) Foreign Application Priority Data

Jul. 23, 2001   (JP) ............................. 2001-221560

(51) Int. Cl.
*B01D 3/00* (2006.01)
*B01D 47/00* (2006.01)

(52) U.S. Cl. ................. 203/8; 202/158; 203/100; 203/DIG. 21; 261/113; 261/114.5; 261/128

(58) Field of Classification Search .............. 203/8, 203/9, 100, DIG. 21; 202/158; 261/113, 261/114.5, 128; 562/600; 560/218
See application file for complete search history.

(56) References Cited

U.S. PATENT DOCUMENTS

| | | | |
|---|---|---|---|
| 2,767,966 A | 10/1956 | Chave | |
| 3,233,708 A | 2/1966 | Glitsch | |
| 3,589,689 A * | 6/1971 | English | 261/114.3 |
| 3,603,129 A * | 9/1971 | Williams et al. | 72/324 |
| 3,633,882 A * | 1/1972 | Karakawa et al. | 261/113 |
| 3,717,553 A | 2/1973 | Otsuki et al. | |
| 3,988,213 A | 10/1976 | Yoshida et al. | |
| 4,174,363 A | 11/1979 | Bruckert | |
| 4,184,857 A * | 1/1980 | Iijima et al. | 95/264 |
| 6,214,174 B1 | 4/2001 | Matsumoto et al. | |
| 6,372,944 B1 * | 4/2002 | Matsumoto et al. | 562/600 |
| 6,423,235 B1 * | 7/2002 | Shimoi et al. | 210/760 |
| 6,641,700 B1 * | 11/2003 | Matsumoto et al. | 202/158 |
| 6,755,943 B1 * | 6/2004 | Mizutani et al. | 203/99 |

FOREIGN PATENT DOCUMENTS

| | | |
|---|---|---|
| EP | 0 856 343 A1 | 8/1998 |
| EP | 1 029 573 A2 | 8/2000 |
| JP | A-10-212249 | 8/1998 |
| JP | A-2000-300903 | 10/2000 |

* cited by examiner

*Primary Examiner*—Virginia Manharan
(74) *Attorney, Agent, or Firm*—Mathews, Shepherd, McKay & Bruneau, P.A.

(57) ABSTRACT

A perforated tray without downcomer having only a small deviation between the opening ratio based on the diameter of a column and the actual opening ratio and a perforated tray column without downcomer formed by disposing such perforated trays without downcomer are provided. The perforated trays without downcomer are characterized by having a ratio of (A)/(B) in the range of 1.1-1.5, wherein A denotes the opening ratio found from the standard pitch between centers of holes and (B) denotes the opening ratio based on the diameter of a column.

7 Claims, 9 Drawing Sheets

PERFORATED TRAY COLUMN WITHOUT DOWNCOMER

BACKGROUND OF THE INVENTION

1. Field of the Invention

This invention relates to a perforated tray column without downcomer formed by setting perforated tray without downcomers in place and a method for distillation by the use of the perforated tray column without downcomer. More particularly, this invention relates to a perforated tray column without downcomer equipped with in place such perforated tray without downcomers in order to effectively prevent the formation of a polymer of an easily polymerizable compound such as (meth)acrylic acid or a liquid containing such an easily polymerizable compound (hereinafter occasionally represented simply as "easily polymerizable compounds") and allow an easily polymerizable compound to be distilled stably for a long time and a method for performing the distillation by the use of the perforated tray column without downcomer.

2. Description of the Related Art

Concerning such easily polymerizable compounds as (meth)acrylic acid and esters thereof, the distilling and rectifying such an easily polymerizable compound in the presence of oxygen or a polymerization inhibitor with the object of preventing the compound from polymerization has been heretofore practiced widely on a commercial scale. It has been also known to employ for this distillation perforated tray without downcomers and a perforated tray column without downcomer formed of these trays.

The perforated tray without downcomers used in the perforated tray column without downcomer each have holes formed nearly uniformly throughout the entire surface except those holes for clamps and bolts which are used in fixing the trays in conjunction with support beams and support rings. Since these perforated trays without downcomer are fixed with clamps and bolts inside the perforated tray column without downcomer generally in a divided pattern, they give rise to portions having no hole by reason of construction. Thus, a discrepancy arises between an actual opening ratio of the perforated tray of the column and an opening ratio of holes per unit area of the perforated tray.

When a perforated tray column without downcomer formed by setting in place such perforated trays without downcomer as revealing this discrepancy in an unduly large magnitude is used in distilling (meth)acrylic acid, for example, it encounters the problem that the efficiency of separation in the operation of distillation is lowered as compared with a counterpart having a smaller discrepancy. When the discrepancy is large, the distillation of (meth) acrylic acid, for example, performed with the wireless perforated tray column formed by setting in place perforated trays without downcomer of this large discrepancy entails the problem that since the operation possibly forms a polymer, it must be suspended to allow artificial or chemical removal of the polymer from the column.

The present inventors have proposed in U.S. Pat. No. 6,214,174, as a means to prevent the formation of a polymer during the distillation of (meth)acrylic acid, for example, even when the discrepancy revealed by the column in use is large, a method for promoting the prevention of the polymerization by providing perforated tray support members with openings adapted to preclude stagnation of a liquid on the support members. They have proposed in European Patent No. 1,029,573A2 a method for preventing the polymerization by specifying the diameter of holes in a perforated tray without downcomer, the distance between the centers of holes, the thickness of perforated trays, the opening ratio of holes, and the interval between adjacent perforated trays thereby preventing a liquid and a gas from channeling and imparting improved dispersibility thereto.

They, however, have been unable to discover a means which is effective in decreasing the discrepancy itself which arises between an actual opening ratio of the perforated tray of the column and an opening ratio of holes per unit area of the perforated tray.

SUMMARY OF THE INVENTION

The present inventors, as a result of successive diligent studies performed on a perforated tray column without downcomer equipped with in place novel perforated trays without downcomer and a method for distillation by the use of this perforated tray without downcomer column with the object of accomplishing the invention mentioned above, have found that, even when the perforated trays without downcomer are suffered by reason of construction to give rise to portions having no hole because they are fitted in a divided pattern inside the perforated tray column without downcomer, the dispersibility of a liquid and a gas on the perforated trays is improved by specifying the ratio (A)/(B), i.e. the ratio of the opening ratio (A) determined from the standard pitch between the centers of holes calculable at the stage of design as newly discovered by the present inventors and the opening ratio (B) determined from the diameter of a column, so as to fall in a specific range and/or by arranging the perforated tray without downcomers so as to allow at least part of the holes thereof to overlie support members or so as to limit the distance between the centers of holes and the support members within 50 mm and that the formation of a polymer during the distillation of (meth)acrylic acid, for example, can be effectively repressed or prevented by preventing stagnation of a liquid on the perforated trays without downcomer and on the support members. This invention has been perfected as a result.

Specifically, an object of this invention is to provide a perforated tray column without downcomer which is equipped with in tray such perforated trays without downcomer as revealing only a small discrepancy between an actual opening ratio of the perforated tray of the column and an opening ratio of holes per unit area of the perforated tray.

Another object of this invention is to provide a perforated tray column without downcomer formed by setting in place such perforated trays without downcomer as excelling in the efficiency of separation in the operation of distillation and further allowing prevention of the formation of a polymer in the operation of distillation and a method for distillation which is effected by using this perforated tray column without downcomer.

By virtue of this method, in a perforated tray column without downcomer equipped with in place such perforated trays without downcomer as each comprising a plurality of divided tray segments, it is made possible to restrain and minimize the discrepancy between the opening ratio based on the diameter of a column and the opening ratio based on the standard hole pitch because the column is so formed as to set the ratio of the opening ratio (A) determined from the standard pitch between the centers of holes to the opening ratio (B) determined from the diameter of column, (A)/(B), in the range of 1.1-1.5. When the distillation of (meth) acrylic acid is performed by using the perforated tray column without downcomer formed by setting such perforated trays without downcomer in place, therefore, the efficiency of separation in the operation of distillation can be greatly improved as compared with the conventional counterpart which has been incapable of restraining or contracting the discrepancy. Further, when the distillation of (meth) acrylic acid is carried out by using the perforated tray column without downcomer equipped with perforated trays without downcomer in place, the formation of a polymer can be effectively repressed or prevented because the discrepancy is restrained and minimized as described above. Thus, the number of rounds for suspending the operation to allow artificial or chemical removal of the polymer can be markedly decreased. This fact proves advantageous from the economic point of view.

This invention is further characterized by providing the joining parts forming union between two discrete divided tray segments of the perforated trays without downcomer mentioned above with notches and/or liquid holes and enabling these notches and liquid holes to function very efficiently and effectively. Thus, the discrepancy between the opening ratio (B) determined from the diameter of a column at the joining parts and the opening ratio (A) based on the standard hole pitch is repressed to the minimum. This invention, therefore, is at an advantage in acquiring in the distillation of (meth)acrylic acid, for example, such effects as preventing occurrence of a channeling in the joining parts, improving the efficiency of separation, and preventing formation of a polymer.

In this invention, since the perforated tray column without downcomer is characterized by arranging the perforated trays without downcomer so as to allow at least part of the holes thereof to overlie support members or so as to limit the distance between the centers of the holes and the support members within 50 mm, the holes located in or near the parts in which the perforated trays without downcomer and the support member overlap each other are allowed to maximize the efficiency of operation thereof. Thus, this invention, as adopted in distilling (meth)acrylic acid, for example, is at an advantage in acquiring such effects as preventing occurrence of a channeling in the joining parts, improving the efficiency of separation, and preventing formation of a polymer.

Further, the perforated tray column without downcomer contemplated by the present invention is characterized by having holes formed in the support members in such a manner that the holes in the support members may overlie the corresponding holes in the perforated trays without downcomer when the holes in the perforated trays without downcomer are disposed on the support members. This invention, therefore, allows constant elimination of the stagnation of a liquid in or near the relevant support members. Thus, this invention, particularly when used in distilling an easily polymerizable compound or an easily polymerizable compound-containing liquid, is at an advantage in acquiring a conspicuous effect of unusually excelling in the prevention of the polymerization thereof. It is especially at an advantage in enabling a plurality of such perforated trays without downcomer disposed in the form of superposed stages to manifest such functions and effects efficiently.

This invention, owing to the use of the perforated tray column without downcomer described above in distilling an easily polymerizable compound or the easily polymerizable compound-containing liquid, is at an advantage in acquiring a conspicuous effect of unusually excelling in the prevention of the polymerization thereof.

BRIEF DESCRIPTION OF THE DRAWINGS

FIG. 2 is a simple explanatory diagram for explaining the contents of words used in defining an opening ratio (A) determined from the standard pitch between centers of holes and an opening ratio (B) based on the diameter of a column when the holes in a perforated tray without downcomer are arranged in an equilateral triangle array.

FIG. 3 is a simple explanatory diagram for explaining the contents of words used in defining an opening ratio (A) determined from the standard pitch between centers of holes and the opening ratio (B) based on the diameter of a column when the holes in a perforated tray without downcomer are arranged in a square array.

FIG. 7 is a schematic explanatory diagram illustrating in type section a joining part between adjacent divided tray segments in a plurality of divided tray segments forming a perforated tray without downcomer.

FIG. 8 is a schematic cross section illustrating in type section various modes of embodiment of the state of disposing notches and/or liquid holes in joining parts forming union between two discrete divided tray segments of a perforated tray without downcomer.

FIG. 9 is a schematic diagram illustrating in type section one mode of embodiment of the state having liquid holes disposed in a divided tray segment and a support beam.

DESCRIPTION OF THE PREFERRED EMBODIMENTS

Now, the modes of embodying this invention will be described below with reference to the accompanying drawings.

Figure 1:
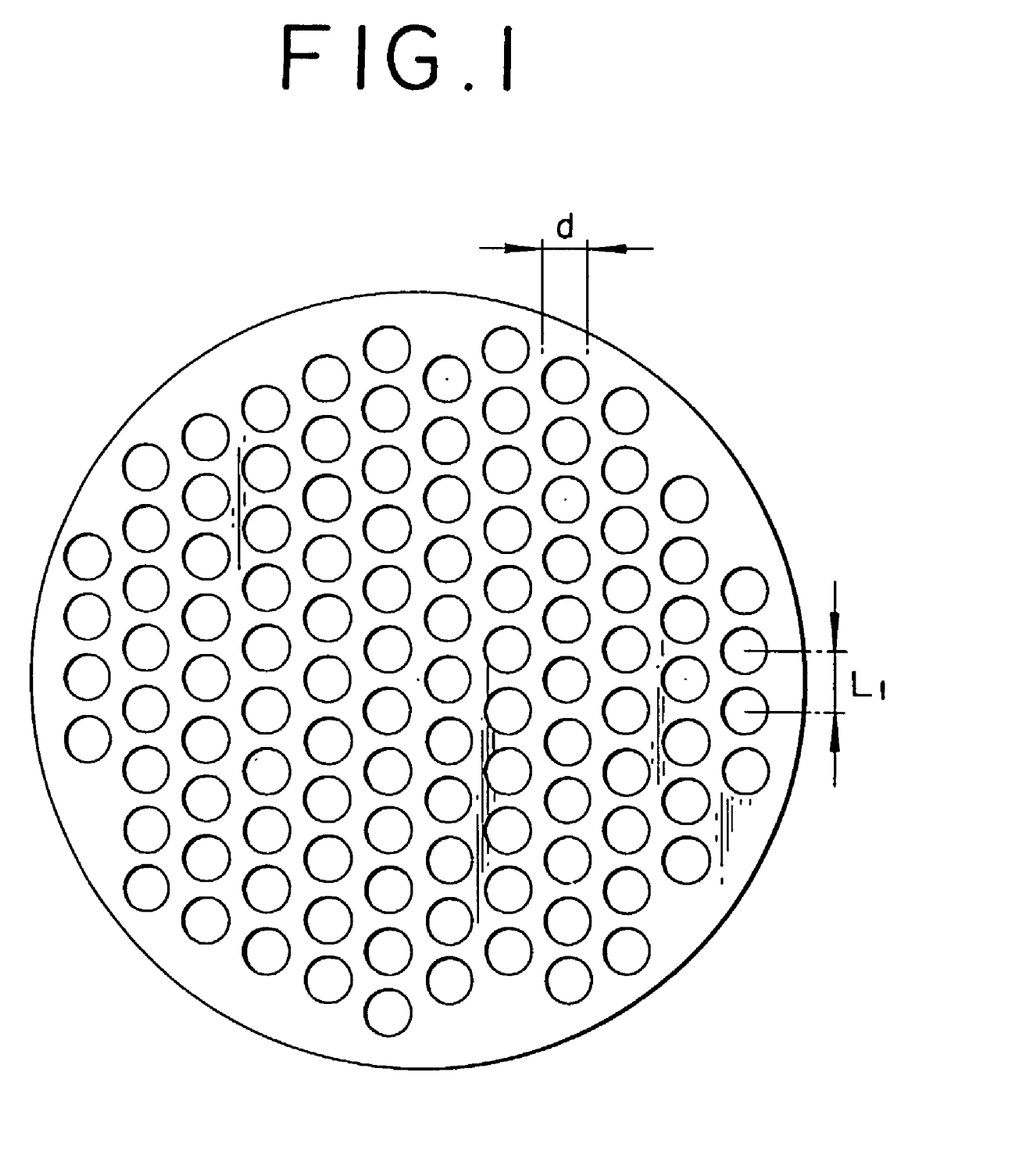
FIG. 1 is a schematic diagram illustrating in type section the appearance of a perforated tray without downcomer which used in this invention as one embodiment of the perforated tray without downcomer, has holes formed in the perforated tray without downcomer as arranged in an equilateral triangle array.

FIG. 1 is a schematic diagram (omitting such factors as division) illustrating in type section a perforated tray without downcomer which, as one embodiment of the perforated tray without downcomer according to this invention, has holes formed in the perforated tray without downcomer as arranged in an equilateral triangle array. In a perforated tray without downcomer 101 contemplated by this invention, as illustrated in FIG. 1, a plurality of holes 103 adapted to satisfy the following requisites of this invention and further to assume a substantially uniform diameter are disposed at a substantially equal distance $L_1$ from each other as arranged in an equilateral triangle array or in an isosceles triangle array.

That is, the perforated tray without downcomer of this invention is characterized by having an opening ratio such that the opening ratio (A) determined from the standard pitch between the centers of holes and the opening ratio (B) based on the diameter of a column form a (A)/(B) ratio in the range of 1.1-1.5, preferably a (A)/(B) ratio in the range of 1.2-1.4, more preferably 1.3-1.4. If the (A)/(B) ratio mentioned above falls short of 1.1, the shortage will render it difficult to manufacture a perforated tray without downcomer formed of a plurality of divided tray segments. Conversely, if the (A)/(B) ratio exceeds 1.5, the excess will render the array of holes uneven, degrade the dispersibility of a liquid and a gas, and exert an influence on the efficiency of column and the polymerizability of a monomer. Incidentally, the holes in the perforated tray without downcomer of this invention are preferable to be arranged in such a triangle array as shown in FIG. 1 or in a quadrangle array. This arrangement, however, does not need to be particularly restricted.

Thus, the opening ratios (A) and (B) mentioned above are defined as follows, depending on the arrangement of the holes in the perforated tray without downcomer mentioned above.

Opening ratio (A) determined from standard pitch between centers of holes=[Total opening hole area in unit triangle (or quadrangle)/Area of unit triangle (or quadrangle)]×100(%)

Opening ratio (B) based on diameter of column=[Total area of openings/Area of cross section of tower]×100(%)

The words used herein in defining the opening ratio (A) mentioned above are specified as follows.

Figure 2A:
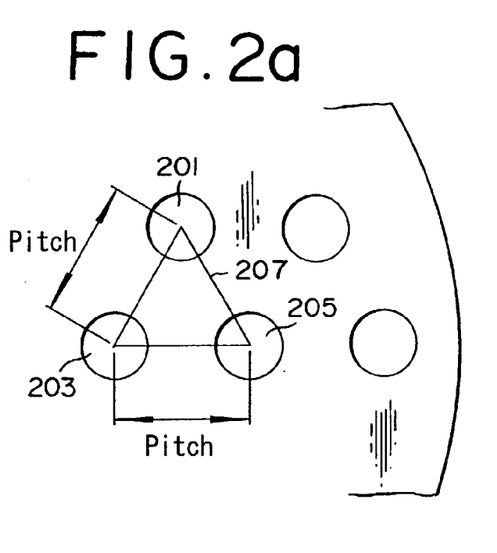
FIG. 2(a) is a simple explanatory diagram for explaining a unit triangle and FIG. 2(b) is a simple explanatory diagram of the total opening hole area in the unit triangle for explaining the opening ratio (A).
Figure 2B:
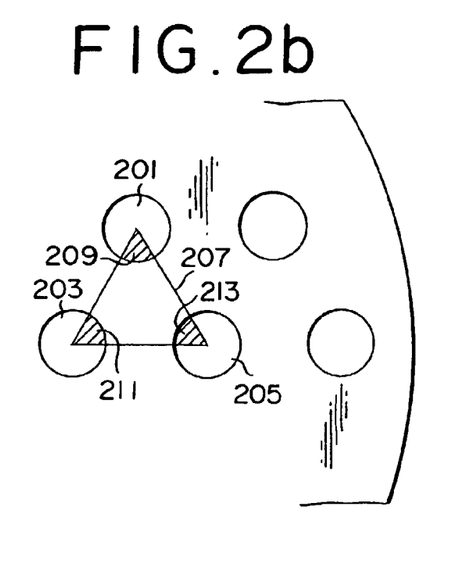

(i) In the case of the arrangement of holes in the perforated tray without downcomer in an equilateral triangle array (for illustration, refer to FIG. 2);

The term "unit triangle" refers to a triangle 207 which is formed by connecting the centers of three holes 201, 203, and 205 arranged in a triangle array as illustrated in FIG. 2(a). The length of one side of this equilateral triangle 207 is designated as "a pitch." The term "area" of the unit triangle refers to the area of the triangle 207 to be formed as illustrated in FIG. 2(a) and (b). The expression "total opening hole area in the unit triangle" refers to the total area of parts (hatched parts) 209, 211, and 213 of the three holes 201, 203, and 205 which are enclosed with the unit triangle 207 as illustrated in FIG. 2(b).

To continue this explanation with reference to a concrete example, in the case of a perforated tray without downcomer having such specifications as diameter of column: 2500 mm, diameter of hole in perforated tray without downcomer (diameter of hole in tray): 12 mm ø, number of holes in perforated tray without downcomer (number of holes in tray): 11768, and pitch between centers of holes: 19 mm and having the holes arranged in an equilateral triangle array, the calculation is carried out as follows.

Opening ratio (A) determined from standard pitch between centers of holes=$(\pi/4 \times 12^2 \div 2)/(\frac{1}{2} \times 19^2 \times \sin 60°) \times 100 = 36.2\%$ Opening ratio (B) based on diameter of column=$(\pi/4 \times 12^2 \times 11768)/(\pi/4 \times 2500^2) \times 100 = 27.1\%$ Hence, (A)/(B)=36.2/27.1=1.34.

Figure 3A:
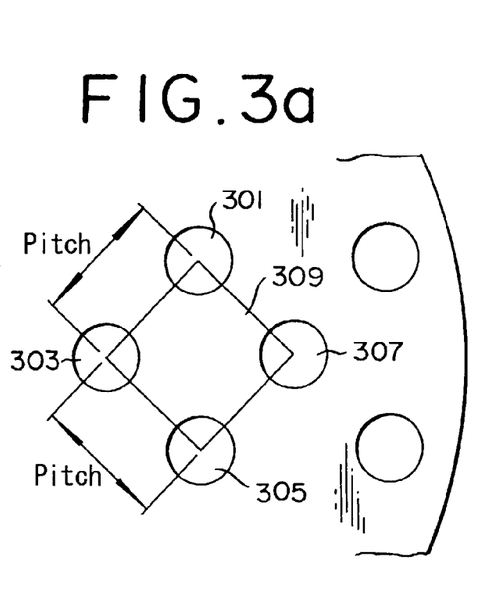
FIG. 3(a) is a simple explanatory diagram for explaining a unit square and FIG. 3(b) is a simple explanatory diagram of the total opening hole area in the unit square for explaining the opening ration (A)
Figure 3B:
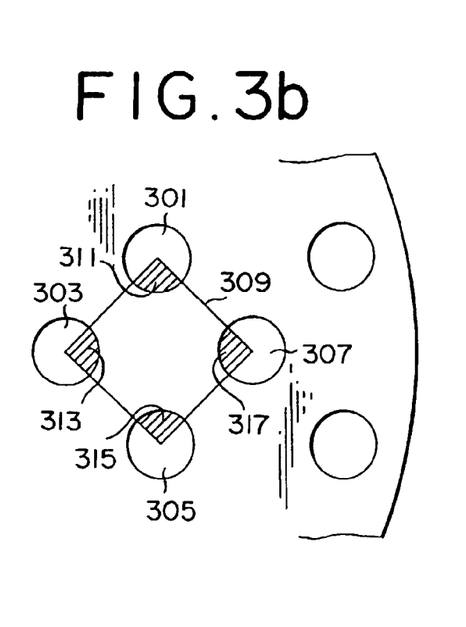

(ii) In the case of the arrangement of holes in the perforated tray without downcomer in a square array (for illustration, refer to FIG. 3);

The term "unit quadrangle" in the case of a square array refers to a quadrangle 309 which is formed by connecting the centers of four holes 301, 303, 305, and 307 arranged in a quadrangle array as illustrated in FIG. 3(a). The length of one side of this square 309 is designated as a "pitch." The expression "area of the unit quadrangle" refers to the area of the quadrangle 309 which is formed as illustrated in FIG. 3(a). The expression "total opening hole area in the unit quadrangle" refers to the total area of hatched parts 311, 313, 315, and 317 of the four holes 301, 303, 305, and 307 which are enclosed in the unit quadrangle as illustrated in FIG. 3(b).

Figure 4:
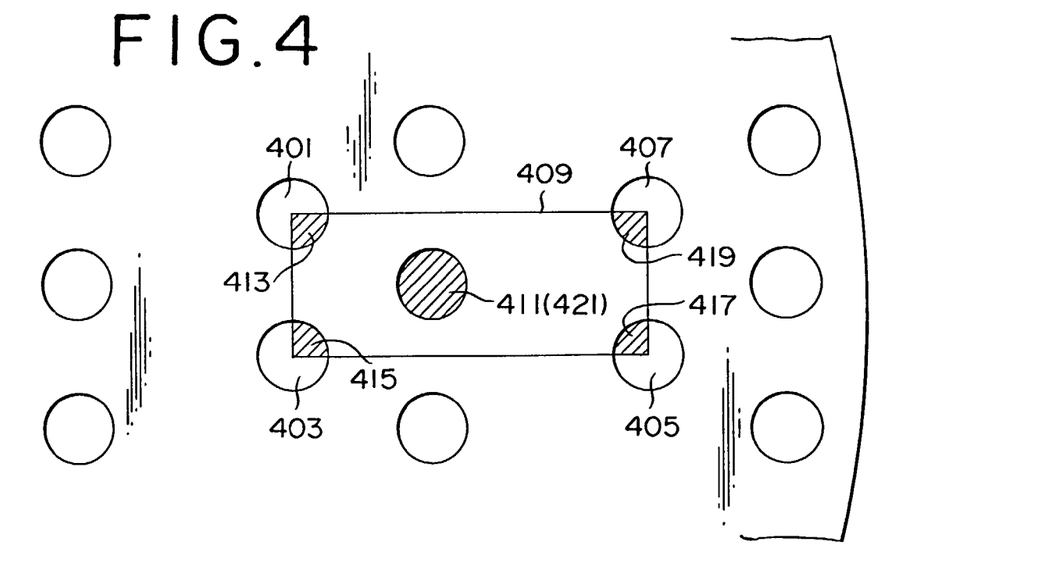
FIG. 4 is a simple explanatory diagram for explaining the contents of words used in defining an opening ratio (A) determined from the standard pitch between centers of holes and an opening ratio (B) based on the diameter of a column when the holes in a perforated tray without downcomer are arranged in a quadrangleal (except square) array.

(iii) In the case of the arrangement of holes in the perforated tray without downcomer in a quadrangle array (for illustration, refer to FIG. 4);

When the cases (i) and (ii) mentioned above do not apply, the specifications are made with respect to the unit quadrangle.

The expression "unit quadrangle in the case of an array other than the square array" refers to a quadrangle 409 which is formed by connecting the centers of four holes 401, 403, 405, and 407 based on the unit quadrangle (no pitch exists in this case) specified as illustrated in FIG. 4. The expression "area of the unit quadrangle" refers to the area of the quadrangle 409 which is formed as illustrated in FIG. 4. The expression "total opening hole area in the unit quadrangle" refers to the total of the areas of hatched parts 413, 415, 417, 419, and 421 of the holes 401, 403, 405, 407, and 411 enclosed in the unit quadrangle 409 as illustrated in FIG. 4. The number of holes enclosed in the unit quadrangle 409 is not invariably four as found in the diagram.

The term "opening ratio (B) based on the diameter of a column" means the ratio of the total area of all the holes in a perforated tray without downcomer to the cross-sectional area of a perforated tray column without downcomer (sectional area of the column) equipped with such perforated tray without downcomers.

Incidentally, the terminal part of a perforated tray without downcomer may possibly fail to offer a space enough to form a hole as illustrated in FIG. 1, depending on the arrangement of holes in the tray. This invention, therefore, contemplates allowing proper combination of an equilateral triangle array, a square array, and/or a quadrangle array within one perforated tray without downcomer in order that the holes may be efficiently disposed in the tray as far as the terminal part thereof. Thus, the perforated tray without downcomer may be so formed as to set the opening ratios (A)/(B) mentioned above in the preferred range of 1.3-1.4. Since the perforated tray without downcomer consequently enables a gas or a liquid to flow effectively to the terminal part thereof, the stagnation of a liquid can be prevented and the formation of a polymer can be effectively prevented. Even when various arrays are combined in the formation of holes in one perforated tray without downcomer, the opening ratio (A) of this one perforated tray without downcomer can be determined by dividing the perforated tray without downcomer into blocks each containing holes in the relevant array and applying the definition of the array to the relevant block.

Concerning the holes in the perforated tray without downcomer of this invention, the satisfaction of the requisites specified herein below is at an advantage in enabling an easily polymerizable compound to be effectively prevented from forming a polymer by distilling the compound by using a perforated tray column without downcomer equipped with such perforated trays without downcomer as mentioned above.

First, the holes of the perforated tray without downcomer do not need to be particularly restricted on account of their shapes but may arbitrarily assume any of varying shapes such as a circle, an ellipse, a triangle, a quadrangle and other similar polygons. Among other conceivable shapes, the circle proves preferable because circular holes of a necessary diameter can be easily formed by using a conventional punching press or drill.

The diameter denoted by the symbol d in FIG. 1 of the holes in the perforated tray without downcomer is generally in the range of 10-25 mm, preferably in the range of 12-22 mm when the holes have a circular shape. If the diameter of hole d falls short of 10 mm, the shortage will be at a disadvantage in not allowing easy drop of a liquid through the holes and suffering a compound to polymerize easily. Conversely, if this diameter of hole exceeds 25 mm, the excess will be at a disadvantage in suffering a liquid to stagnate on the tray because of an unduly large distance between holes and also suffering a compound to polymerize easily. In the case of the holes of other shape, the size of the particular shape may be so decided as to assume an area equivalent to the area of openings to be calculated from the diameter of such a circular hole as mentioned above.

The thickness of the perforated tray without downcomer is generally in the range of 2-8 mm, preferably in the range of 2-4 mm. If the thickness of this tray falls short of 2 mm, the shortage will be at a disadvantage in suffering the liquid on the perforated tray without downcomer to be sloped by a vibration generated in the tray and to be easily dried partly. Conversely, if this thickness exceeds 8 mm, the excess will be at a disadvantage in inducing a liquid to stagnate within the holes and undergo polymerization easily.

The opening ratio (B) based on the diameter of a column is generally in the range of 10-30%, preferably in the range of 12-27%. When the holes are assumed to have a fixed diameter and if the opening ratio (B) based on the diameter of a column falls short of 10%, this shortage will be at a disadvantage in inducing the liquid on the tray to stagnate and undergo polymerization easily. If the opening ratio (B) based on the diameter of a column exceeds 30%, the excess will be at a disadvantage in suffering the liquid on the tray to be deteriorated in the state of fluidity and to be easily polymerized.

The technique of using a perforated tray without downcomer in subjecting the easily polymerizable compound to gas-liquid contact must cause the liquid on the perforated tray without downcomer to fall down the holes to a certain extent and the gas to ascend through the holes as well while it must retain the liquid to a certain extent on the tray. That is to say, this technique must control the flow of the liquid and that of the gas through the holes in a proper state. Heretofore, this control has been usually difficult to accomplish. By satisfying the requisites mentioned above, it is made possible to control the descent of the liquid and the ascent of the gas through the holes in an excellent state and ensure the actuation of the gas-liquid contact. Moreover, when the flow of the gas and the liquid via the holes is properly controlled as described above and the liquid is consequently retained properly on the perforated tray without downcomer, then the presence of the liquid on the perforated tray without downcomer will be freed from unevenness and the interior of the perforated tray column without downcomer equipped with such perforated trays without downcomer will be fully satisfactorily wetted with the liquid.

Specifically, by using perforated trays without downcomer satisfying the requisites for the construction of this invention in addition to fulfilling the requisite of specifying the ratio of opening ratios (A)/(B), it is made possible to realize simultaneously and infallibly the state of keeping the interior of a perforated tray column without downcomer equipped with such perforated trays without downcomer wetted with a liquid and the state of precluding a gas and a liquid from channeling or stagnating. Thus, this invention is at an advantage in further exalting the effect of preventing polymerization.

Figure 5:
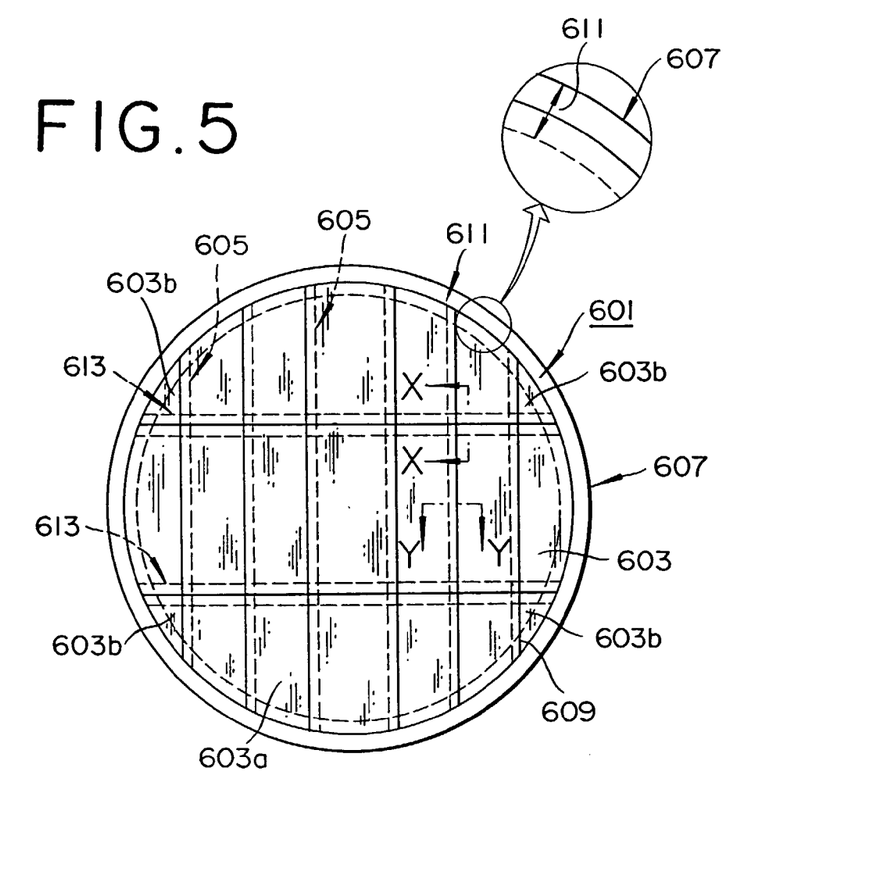
FIG. 5 is a schematic diagram of a column section illustrating in type section a typical embodiment of a perforated tray without downcomer formed of a plurality of divided tray segments in one and the same stage of a perforated tray column without downcomer and support members for supporting the perforated tray without downcomer.

FIG. 5 is a schematic diagram representing in type section a typical mode of embodiment of a perforated tray without downcomer constructed with a plurality of divided tray segments and support members for supporting the perforated tray without downcomer. As depicted in FIG. 5, one circular perforated tray without downcomer 601 is formed of a total of 21 divided tray segments 603, namely 17 approximately rectangular divided tray segments 603a which are different in size from one another plus four approximately triangular divided tray segments 603b. For the convenience of illustration, FIG. 5 omits depicting holes in the perforated tray without downcomer 601. The perforated tray without downcomer 601 is supported by a support ring 611 and support beams 613 as support members. The regions corresponding to these support members and regions 605 in which the terminal parts of the individual divided tray segments 603 of the perforated tray without downcomer 601 are superposed are indicated with broken lines in FIG. 5. The outermost circle shown in FIG. 5 represents the inner periphery inner wall surface of a column wall 607 and the most inner circle represents an edge of the support ring 611 and the circle in the middle represents the outer periphery of the perforated tray without downcomer 601.

Figure 6:
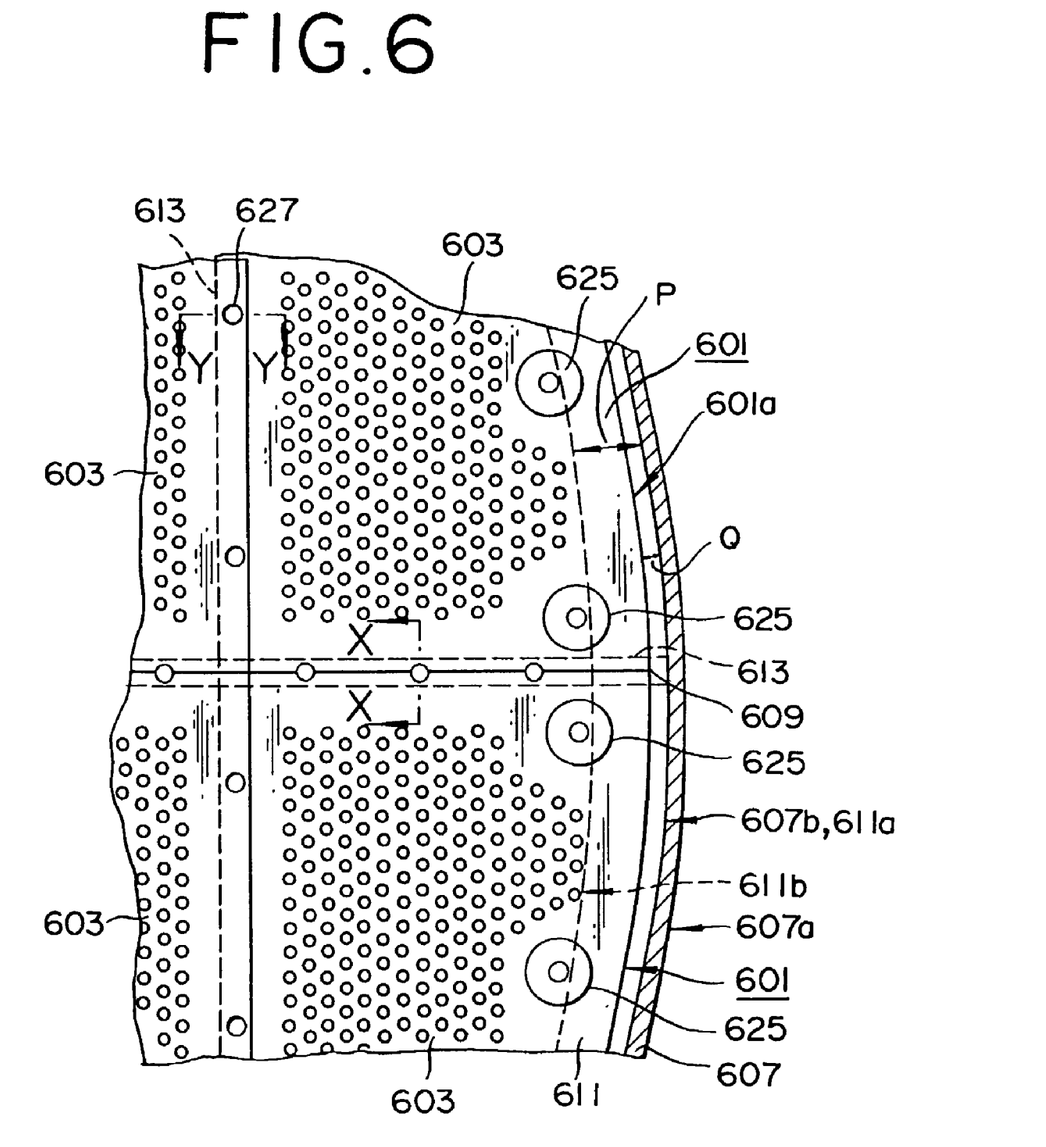
FIG. 6 is an explanatory diagram illustrating the construction of a joining part between adjacent perforated trays when a plurality of perforated trays are used in one and the same stage in a perforated tray column without downcomer shown in FIG. 5.

FIG. 6 is an explanatory diagram illustrating the construction of a joining part for adjacent perforated trays among a plurality of perforated trays used in one and the same stage in a perforated tray column without downcomer shown in FIG. 5. Where perforated tray without downcomer 601 constructed with a plurality of divided tray segments is disposed in one stage of a perforated tray column without downcomer as described above, two or more individual divided tray segments 603 are mounted on the support ring 611 and the support beams 613 as illustrated in FIG. 6. In the joining part 609 between the divided tray segments 603, and the terminal parts of these divided tray segments 603 are held in nearly intimately contact with each other and, for the purpose of retaining this state of intimate contact, are fixed to the support ring 611 and the support beams 613 with clamps 625 and bolt-nuts 627 as fixing members. Further, the arcuate part of the outermost periphery represents an outer periphery 607a of the wall 607 of the perforated tray column without downcomer, the arcuate part on the inside of the outermost periphery represents an inner wall surface 607b of the wall 607 of the perforated tray column without downcomer, and the arcuate part on the inside thereof represents an outer periphery601a of the perforated tray without downcomer (tray) 601, and the arcuate part (broken line) of the inner periphery represents an edge 611b of the support ring 611. The width denoted by the symbol P in the diagram indicates the width from an outer periphery 611a of the support ring 611 to the edge 611b of the support ring 611. Then, the width denoted by the symbol Q in the diagram represents the gap between the outer periphery 601a of the perforated tray without downcomer 601 and the inner wall surface 607b of the wall of the perforated tray column without downcomer. This gap generally has a size in the range of 5-30 mm.

The support ring 611 mentioned above is disposed as fixed to the wall 607 of the perforated tray column without downcomer and adapted to support the divided tray segments 603 serving as a peripheral part of the perforated tray without downcomer 601 and the support beams 613 are disposed as bridged across the section of the perforated tray column without downcomer and adapted to support the joining part 609 mentioned above. The clamps 625 mentioned above fix the divided tray segments 603 to the support ring 611 and the bolt-nuts 617 mentioned above fix the divided tray segments 603 to the support beams 613.

This invention, when using perforated trays without downcomer each formed of a plurality of divided tray segments, is preferred to have notches and/or liquid holes disposed in the joining parts forming union between adjacent divided tray segments of the perforated tray without downcomer. The situation will be described below with reference to the accompanying drawings.

Figure 7A:
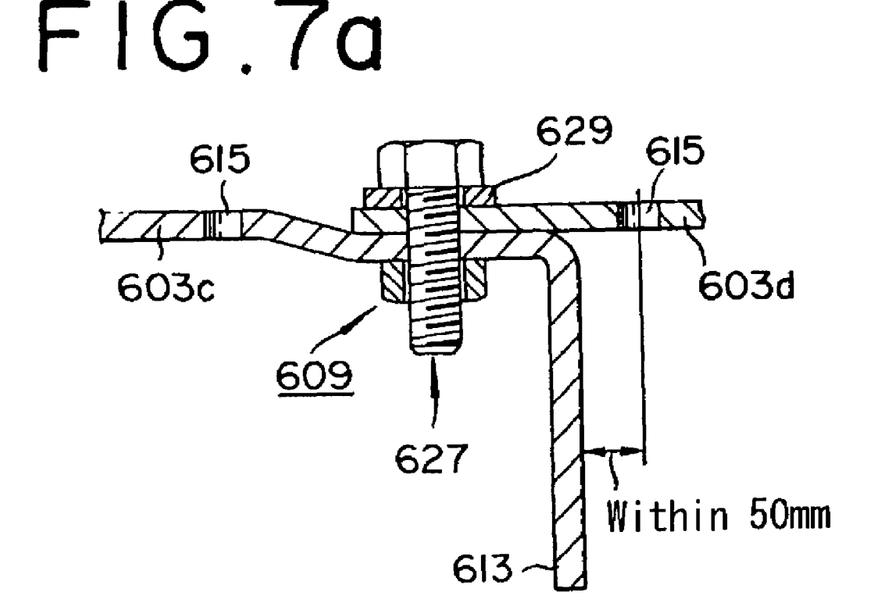
FIG. 7(a) depicts fixation of two discrete perforated trays by the use of a fixing member and corresponds to the cross section of the perforated tray without downcomer shown in FIG. 5 and FIG. 6 as viewed in the directions of the arrows Y-Y.
Figure 7B:
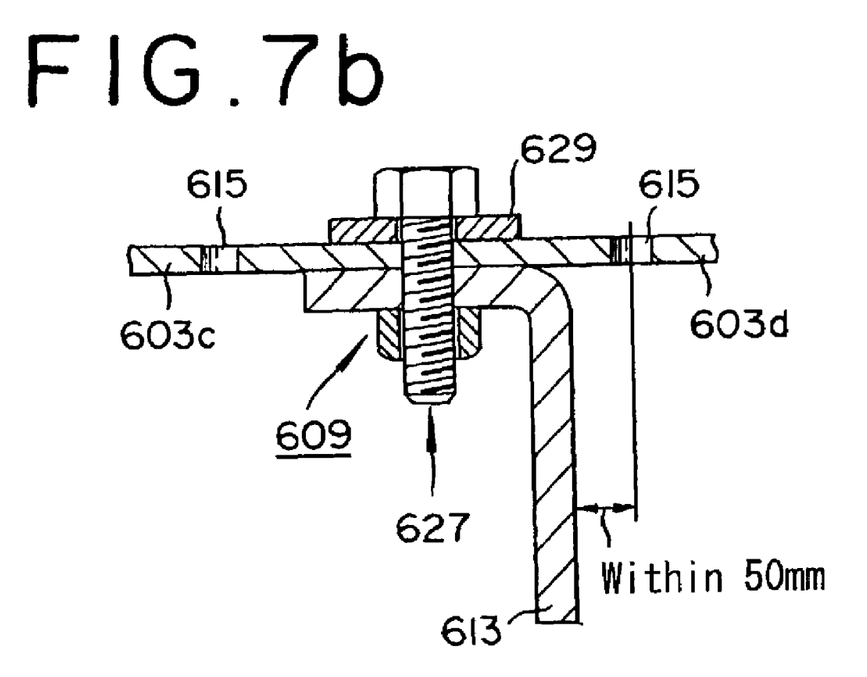
FIG. 7(b) depicts fixation of a perforated tray to a support member by the use of a fixing member and corresponds to the cross section of the perforated tray without downcomer shown in FIG. 5 and FIG. 6 as viewed in the directions of the arrows X-X.
Figure 8A:
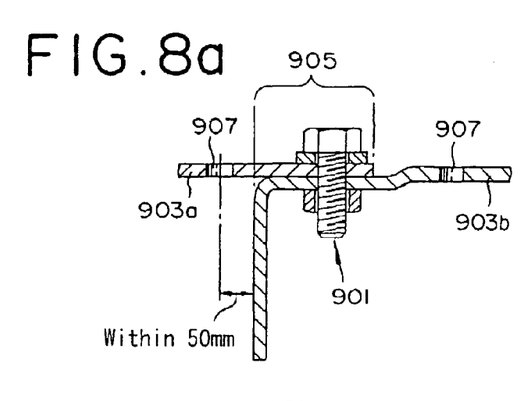
FIG. 8(a) is a schematic cross section representing in type section the appearance of the joining part between two discrete divided tray segment of the perforated tray without downcomer.
Figure 8B:
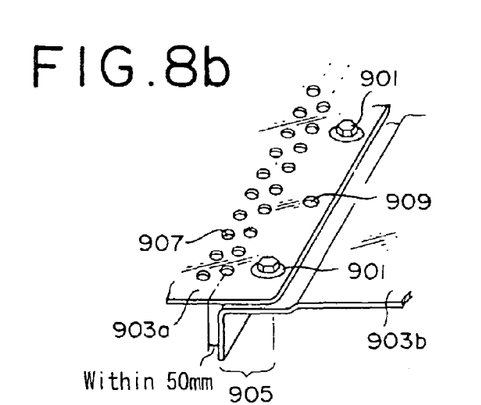
FIG. 8(b) is a schematic perspective view illustrating in type section one mode of embodiment of the state having liquid holes disposed in the joining part.
Figure 8C:
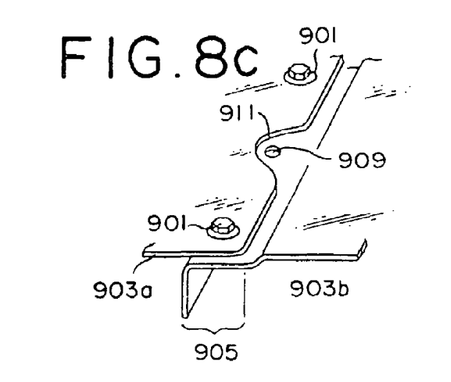
FIG. 8(c) is a schematic perspective view illustrating in type section one mode of embodiment of the state having notches and liquid holed disposed in the joining part.
Figure 8D:
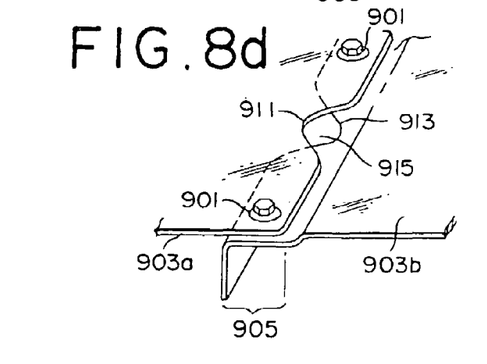
FIG. 8(d) is a schematic perspective view illustrating in type section one mode of embodiment of the state having notches disposed in the joining part.
Figure 9A:
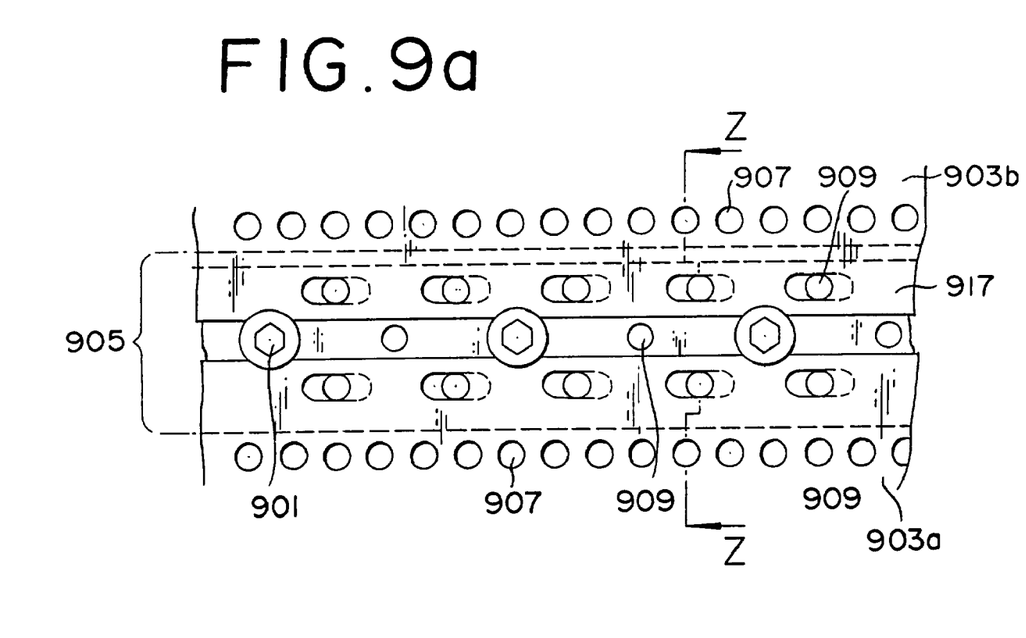
FIG. 9(a) is a schematic plan view representing an upper view of the support beam and FIG. 9(b) is a cross section taken through FIG. 9(a) in the directions of arrows Z-Z.
Figure 9B:
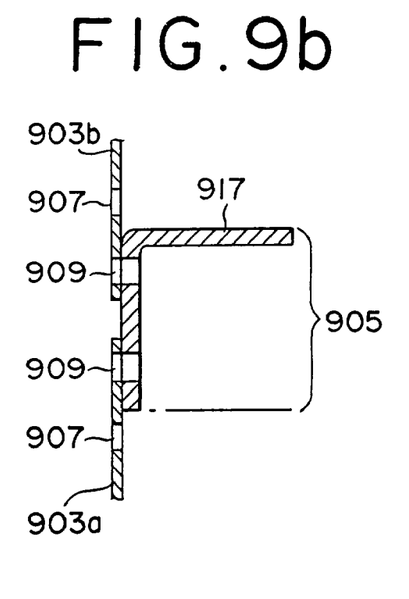

FIG. 7 is a schematic diagram representing in type section one typical mode of embodiment of the joining part forming union between two discrete divided tray segments. Then, FIG. 8 and FIG. 9 are schematic diagrams representing in type section typical modes of embodiment of a perforated tray without downcomer having notches and/or liquid holes disposed in the joining part forming union between two discrete divided tray segments. The wish to join two discrete divided tray segments is fulfilled by bending the terminal part of one of the divided tray segments, overlying the terminal of the other divided tray segment on the bent terminal part, and fixing the superposed parts of the divided tray segments with a fixing member such as a bolt-nut as illustrated in FIG. 7(a) or by overlying the abutting terminal parts of the divided tray segments on a support beam and fixing them with a bolt-nut as illustrated in FIG. 7(b). FIG. 8 depicts union of two discrete divided tray segments 903a and 903b attained by superposing one on the other terminal part of the divided tray segment and fixing the mutually contacting terminal parts with a fixing member 901 such as a bolt-nut. In this case, since the boundary on the upper face side of the superposed part 905 of the terminal parts of the divided tray segments 903a and 903b lacks a perforated part and consequently forms a liquid reservoir, it inevitably induces stagnation of a liquid and possibly forms a cause for the formation of a polymer. Thus, this invention contemplates punching liquid holes 909 as properly spaced in the part other than the part in which the joining part (superposed part) 905 is fixed with the fixing member 901 such as a bolt-nut as illustrated in FIG. 8(b), forming notched parts 911 as properly spaced in the upper side of the divided tray segment 903a in the part other than the part in which the joining part 905 is fixed with the fixing member 901 such as a bolt-nut and punching the liquid holes 909 in the lower side of the divided tray segment 903 b corresponding to the notched part 911 as illustrated in FIG. 8(c), or forming the notched parts 911 as properly spaced in the upper side of the divided tray segment 903a in the part other than the part in which the joining part 905 is fixed with the fixing member 901 such as a bolt-nut, forming notched parts 913 in the lower side of the divided tray segment 903b corresponding to the notched parts 911, and forming notched holes 915 as illustrated in FIG. 8(d) thereby enabling the liquid to flow down rapidly through the liquid holes 909 and/or the notched holes 915 before a liquid reservoir is formed in the joining part 915 thereby precluding the liquid from stagnating in the joining part 905, and effectively preventing an easily polymerizable compound from polymerizing in the neighborhood of the joining part 905. Otherwise, the wish to prevent the easily polymerizable compound from polymerizing in the neighborhood of the joining parts may be accomplished by inserting a notch in either of the upper and lower joining parts, shortening the other joining part, and allowing the liquid to flow through the notched hole. In definitions of the opening ratios of (A) and (B) of the invention, the liquid holes and/or the notches in the joining parts are included for calculation of the opening ratios (A) and (B). This measure is similarly applied and calculated also when the terminal parts of the divided tray segments 903a, 903b are mounted on the support member such as a support beam 917 as illustrated in FIG. 9.

The diameter (size) of the liquid holes or notched holes on the perforated tray side varies with the degree of liquid stagnation in the joining part and, therefore, cannot be uniquely specified. Though it may be properly decided so as to eliminate the liquid stagnation in the joining part, it is generally in the range of 10-25 mm, preferably the range of 12-22 mm. If the diameter of the liquid holes or notched holes falls short of 10 mm, the shortage will be at a disadvantage in suffering the liquid to stagnate inside the liquid holes and induce easy polymerization because the joining part has a thickness twice as large as the other part or in suffering the liquid to stagnate in the joining part, incur difficulty in flowing down through the liquid hole or notched hole, and induce polymerization easily. If the diameter exceeds 25 mm, the excess will be at a disadvantage in inducing the liquid to channeling, necessitating an addition to the width of the joining part (superposed part), and therefore rendering it difficult to form holes within the divided tray segments excluding the joining part with the object of satisfying the ratio of the opening ratios (A)/(B) specified by this invention.

The pitch between the centers of the adjacent liquid holes or notched holes in the joining part is generally in the range of 50-400 mm, preferably in the range of 70-300 mm, and more preferably in the range of 100-200 mm. If the pitch between the centers of the adjacent liquid holes or notched holes in the joining part exceeds 400 mm, the excess will be at a disadvantage in disabling acquisition of an area necessary for allowing the liquid collecting in the joining part to flow down quickly and consequently suffering the liquid to stagnate for a comparatively long time in the joining part and incur easy polymerization. Conversely, if the pitch between the centers of liquid holes or notched holes in the joining part falls short of 50 mm, the shortage will be at a disadvantage in suffering the joining part to reveal deficiency in the strength for allowing attachment of relevant parts thereto and consequently rendering manufacture of the perforated tray without downcomer difficult.

The liquid holes on the support beam side have the possibility of eventually incurring deviation of their positions when the perforated tray is fitted to the support beam. Thus, they are commended to be larger than those on the perforated tray side. They have a length generally in the range of 15-150 mm, preferably in the range of 20-100 mm. Particularly in a part in which a support beam and a perforated tray overlap each other, it is made possible by forming liquid holes on the support beam side in the shape of a large ellipse as illustrated in FIG. 9, for example, to secure through holes of the size of holes in the perforated tray even when the positions of the holes in the beam and in the tray deviate. Incidentally, in the part in which the support beam and the perforated tray do not overlap each other, the liquid holes on the support beam side are not required to be larger than those on the perforated tray side. Refer to FIG. 9. The pitch between the centers of the liquid holes is made to equal the pitch between the centers of the holes on the perforated tray side.

As regards the liquid holes and the notched parts in the joining part, it is proper that these holes should be stripped of such protuberances and burrs which are formed in the edge parts of the holes by warping during the formation thereof. By this trimming, the stagnation of the liquid by reason of protuberances and burrs can be prevented.

The liquid holes and the notched parts in the joining part do not need to be particularly restricted on account of their shape. The liquid holes are generally in a circular shape because they are formed with a punching press or a drill. They do not need to be limited to this particular shape but may assume an arbitrary shape such as, for example, the shape of an ellipse, a triangle, or a quadrangle. Also the notched parts may assume an arbitrary shape such as a triangle, a quadrangle, and other polygons in addition to such a semicircle as illustrated in FIG. 8(c).

The upper surface of the joining part is preferred to be flat from the viewpoint of precluding a gas or a liquid from channeling or stagnating. Such fixing members as bolts and screws, therefore, are preferred to be properly selected so as not to give rise to any protuberance on the upper surface side of the joining part. Even when two joining parts are superposed, a reinforcing member and a support members are preferred to be positioned on the lower surface side so that the upper surface side may retain a flat plane. By so doing, the formation of a polymer during the distillation of an easily polymerizable compound can be more effectively prevented because the gas or the liquid is precluded from channeling or stagnating.

When an easily polymerizable compound is distilled by using a perforated tray column without downcomer equipped with perforated trays without downcomer each formed of not less than two divided tray segments fulfilling the requisites mentioned above, the flow of a gas and a liquid via the holes in the perforated trays without downcomer is controlled more advantageously. Further, by disposing such perforated trays without downcomer in the form of a plurality of stages, it is made possible to realize infallibly both the state of keeping the interior of a perforated tray column without downcomer wet with a liquid and the state of precluding the gas and the liquid from channeling or stagnating. Thus, it is made possible to keep the gas phase part always in contact with a liquid containing a polymerization inhibitor by maintaining a gas-liquid contact and to effect thorough dispersion of the polymerization inhibitor and exalt the effect of preventing polymerization by precluding the channeling or the stagnation. As a result, the formation of a polymer can be effectively prevented.

Figure 10:
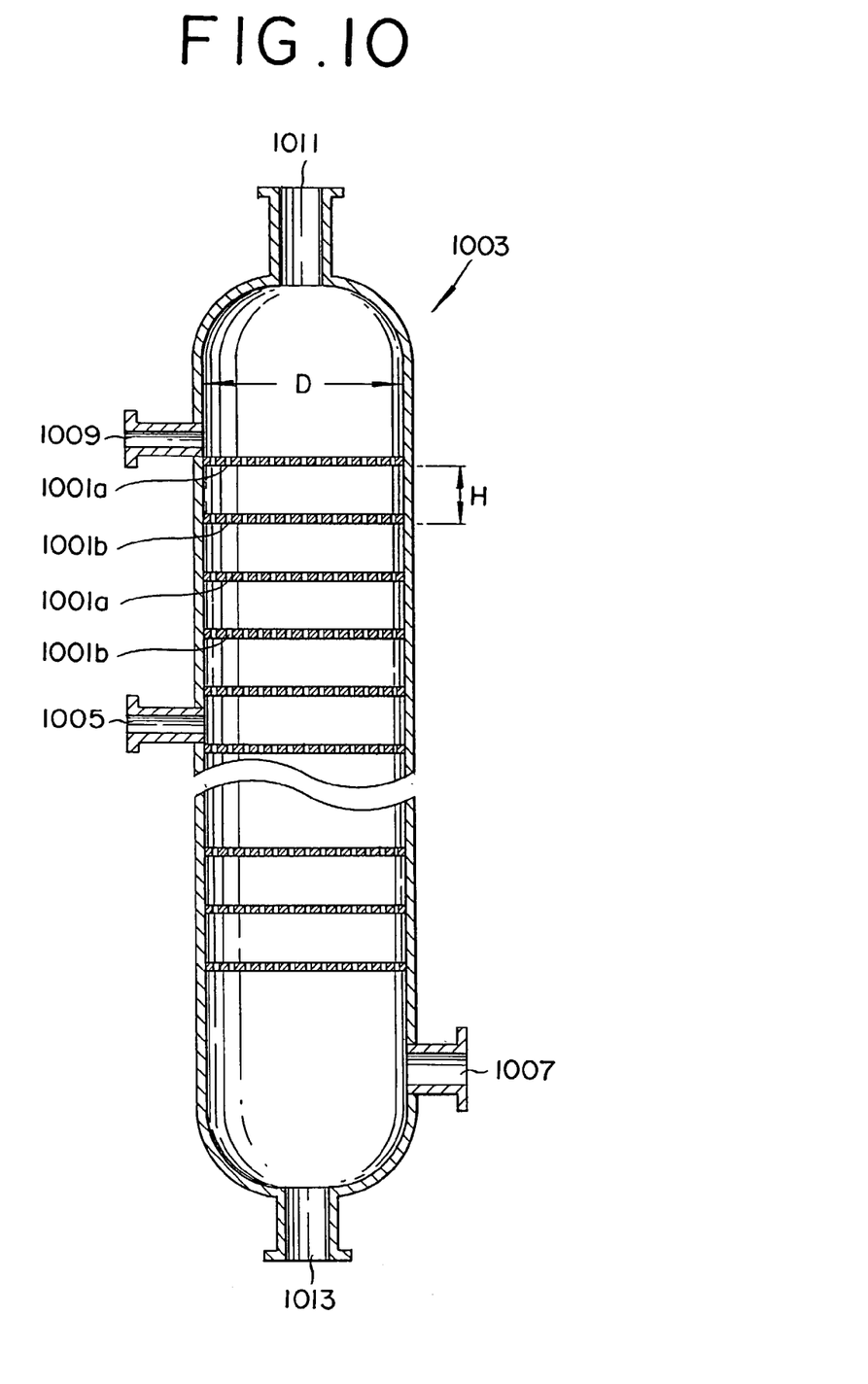
FIG. 10 is a schematic cross section illustrating in type section one mode of embodiment of the construction of a perforated tray column without downcomer contemplated by this invention, having disposed in the form of superposed stages a plurality of perforated trays without downcomer constructed as shown in FIG. 5.

Now, the perforated tray column without downcomer according to this invention will be described below. A perforated tray column without downcomer 1003 which is contemplated by this invention, as illustrated in FIG. 10, is formed by disposing in the form of superposed stages a plurality of perforated trays without downcomer 1001 fulfilling the requisites for the construction of this invention. Further fulfillment of the following requisites in the disposition of such perforated trays without downcomer 1001 is at an advantage in more effectively preventing the formation of a polymer during the distillation of an easily polymerizable compound.

The distance H for spacing the perforated trays without downcomer 1001 disposed in the perforated tray column without downcomer 1003 is preferred to be generally in the range of 0.1 D-0.5 D, wherein D denotes the diameter of the perforated tray column without downcomer 1003. If the distance H which separates the perforated trays without downcomer 1001 disposed in the vertical direction in the perforated tray column without downcomer 1003 falls short of 0.1 D namely 10% of the diameter of the column, the shortage will be at a disadvantage in suffering the gas to channeling and consequently inducing the compound being distilled to polymerize easily. If this distance exceeds 0.5 D namely 50% of the diameter of the column, the excess will be at a disadvantage in unduly lengthening the retention time of the gas and inducing the compound being distilled to polymerize easily in the gas phase part.

The tolerance of horizontality of the individual perforated trays without downcomer 1001 is generally less than 8 mm and preferably less than 4 mm. If the tolerance of horizontality of the perforated trays without downcomer 1001 exceeds 8 mm, the excess will be at a disadvantage in increasing the tradient of a liquid on the perforated tray without downcomer 1001, aggravating the channeling of a gas or a liquid, and suffering the polymerization to occur easily. Incidentally, the term "tolerance of horizontality" as used herein means the difference between the highest point and the lowest point of the perforated tray without downcomer 1001.

The perforated tray column without downcomer, as illustrated in FIG. 10, is provided on the lateral side thereof with a feed inlet 1005, a vapor inlet 1007, and a reflux port 1009, on the top part thereof with a vapor outlet 1011, and in the bottom part thereof with a liquid outlet 1013. The feed inlet 1005 is disposed in the middle stage of the perforated tray column without downcomer 1003, the reflux port 1009 is disposed on the perforated tray without downcomer 1001 on the uppermost stage, and the vapor inlet 1007 is disposed below the lowermost stage of perforated tray without downcomer 1001.

The feed inlet 1005 is intended to fulfill the function of supplying an easily polymerizable compound and is disposed on the top part through the middle stage of the perforated tray column without downcomer 1003 or on the bottom part thereof, depending on the liquid composition of the easily polymerizable compound. The vapor outlet 1011 is connected to a condenser which is not shown in the diagram. The vapor of the easily polymerizable compound which is discharged through this vapor outlet 1011 is condensed in the condenser and part of the condensate is extracted and the remainder thereof is introduced again through the reflux port 1009.

The liquid outlet 1013 is connected to a reboiler which is not shown in the diagram. Through this liquid outlet 1013, the easily polymerizable compound in the perforated tray column without downcomer 1003 is partly extracted and forwarded to the reboiler. In the reboiler, the liquid is boiled again and introduced at least in the state of a gas-liquid mixture through the vapor inlet 1007 into the perforated tray column without downcomer 1003.

Incidentally, the construction for feeding and reintroducing the gas or the liquid of the easily polymerizable compound mentioned above does not need to be restricted to what has been described above but may be liberally selected from various constructions which have been used heretofore for the purpose.

Figure 11:
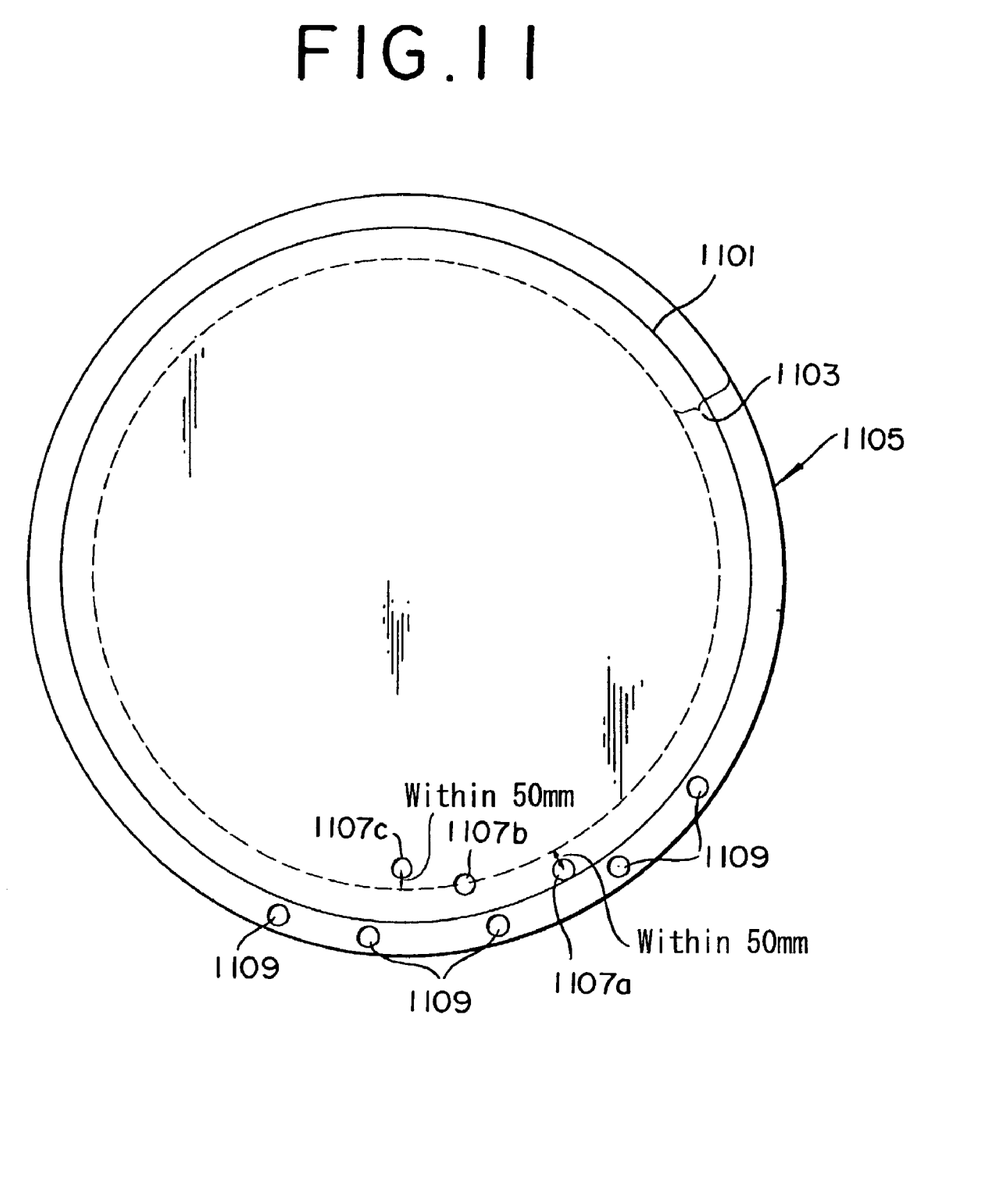
FIG. 11 is a schematic diagram illustrating in type section the state having the holes in a perforated tray without downcomer so arranged as to overlie a support member and the state having the holes in the perforated tray without downcomer so arranged that the distances between the centers of the holes and the support member fall within 50 mm in the perforated tray column without downcomer shown in FIG. 10.

In the perforated tray column without downcomer according to this invention, at least part of the holes in the perforated tray without downcomers are preferred to be so arranged that the distance between the centers of such holes to the support members may be within 50 mm, preferably within 25 mm, and particularly preferably the same of picth of holes or within 15 mm. The perforated tray without downcomers are supported in the perforated tray column without downcomer, as already explained with reference to FIG. 5 and FIG. 6, by such support members as the support ring 611 or the support beams 613. The holes of the perforated trays without downcomer which approximate closely to such support members are preferred to be arranged in the perforated trays without downcomer so that i) they may wholly overlie such support member depicted as a support ring 1103 in FIG. 11 like a hole 1107*a* of a perforated tray without downcomer 1101 or partly overlie it like a hole 1107*b* and/or ii) their centers have distances within 50 mm from such support member depicted as a support ring 1103 in FIG. 11 like those of a hole 1107*a* and a hole 1107*c* of a perforated tray without downcomer 1101 as illustrated in FIG. 11. If the centers of the holes of a perforated tray without downcomer which approximate closely to the support member fall further inside the hole 1107*c*, they will bring such disadvantages as impairing the flow of a fluid near the wall of a column, preventing the cross section of the column from being wholly utilized effectively, and tending to degrade the efficiency of the column and induce polymerization of a compound being distilled. Conversely, if the holes under discussion are arranged on the outer sides of the holes 1107*a*, they bring such disadvantages as increasing the number of holes blocked up by the support ring and causing the liquid to stagnate in the holes and succumb easily to polymerization. Thus, the arrangement of holes such that the holes may partly overlie the support ring like the hole 1107*b* proves most advantageous. The outermost peripheral circle appearing in FIG. 11 represents the inner wall surface of the wall 1105, the circle at the center represents the outer periphery of the perforated tray without downcomer 1101, and the circle of the inner periphery represents the edge of the support ring 1103.

The width of the support ring is generally in the range of 20-100 mm and preferably in the range of 30-80 mm. If this width falls short of 20 mm, the shortage will be at a disadvantage in failing to support the tray fully satisfactorily. If the width exceeds 100 mm, the excess will be at a disadvantage in decreasing the available cross section of the column and, at the same time, impairing the flowability of a gas and a liquid along the wall part of the column and inducing easy polymerization of the compound being distilled. The support ring intervening between the outer periphery of the perforated tray and the wall of the column is preferred to be provided therein with a liquid hole 1109 in order that no liquid may be suffered to stagnate on the support ring. FIG. 11 depicts in type section several liquid holes 1109 in the support ring.

Further, when part of the holes in the perforated tray without downcomer are disposed on the support member so as to overlie it wholly or partly as mentioned i), it is more favorable to provide the support member with holes in such a manner that the holes in the support member and the corresponding holes in the perforated tray without downcomer may be overlapped. To be specific, when circular holes such as the hole 1107*a* are to be disposed so as to overlie wholly the support member such as the support ring 1103, for example, it suffices to provide the support ring 1103 with circular holes similar to the hole 1107*a* in such a manner that the holes formed in the support ring 1103 and the holes 1107*a* in the perforated tray without downcomer may be overlapped. Then, when circular holes such as the hole 1107*b* are to be disposed so as to overlie partly the support member such as the support ring 1103, it suffices to provide the support ring 1103 with a partial notch of a circular hole similar to part of the hole 1107*a* in such a manner that the partial notch of a hole formed in the support ring 1103 and part of the holes of the perforated tray without downcomer may be overlapped. These overlapped holes or notched parts bring the advantage of effectively precluding the stagnation of a liquid on the support member and the derivation of polymerization from the stagnation of the liquid. The holes in the perforated tray without downcomer which are disposed on the support member in this case are included in the holes which are used in finding the ratio of the opening ratios (A) and (B) contemplated by this invention. By the same token, when the support member is a perforated tray itself or a support beam, it is preferable to dispose the holes within 50 mm from the folded part of the support member as illustrated in FIGS. 7(*a*) and (*b*).

The method of distillation contemplated by this invention is characterized by effecting distillation by using the perforated tray column without downcomer described above. The method of distillation of this invention is advantageously used for distilling particularly an easily polymerizable compound or an easily polymerizable compound-containing liquid. The reason for adopting the particular substance as the target of distillation is that the method is capable of manifesting a particularly conspicuous effect in distilling the easily polymerizable compound, for example because the perforated tray column without downcomer of this invention possesses a configuration excelling in the efficiency of separation during the operation of distillation and also because the configuration excels in the effect of preventing the formation of a polymer during the operation of distillation.

As typical examples of the easily polymerizable compound, (meth)acrylic acids and esters of (meth)acrylic acids such as, for example, methyl (meth)acrylates, ethyl (meth)acrylates, n-butyl (meth)acrylates, and hydroxypropyl (meth)acrylates may be cited. The distillation contemplated by this invention embraces an operation of purifying a crude easily polymerizable compound by distillation and an operation of distilling an easily polymerizable compound-containing solution thereby separating and removing prescribed compounds.

Incidentally, the term "distillation" as used in the present specification embraces an operation of purifying the easily polymerizable compound mentioned above, an operation of azeotropic dehydration, an operation of dissipation, an operation of separating a residual solvent, and an operation of absorption. The perforated tray column without downcomer according to this invention is used particularly advantageously for the operation of distillation mentioned above.

Embodiment

Now, this invention will be described more specifically below with reference to working examples thereof.

EXAMPLE 1

A distilling column equipped with 50 perforated trays without downcomer (trays) fulfilling the following specifications:

Arrangement of holes in perforaged tray without downcomer: Equilateral triangle array

| Diameter of hole: | 12 mm |
| Distance (pitch) between centers of adjacent holes: | 20.3 mm |
| Thickness of tray: | 3 mm |
| Diameter of tray: | 2300 mm | superposed as spaced with an interval of 450 mm, and provided in the upper part thereof with a distilling part and in the central part thereof with a raw material feeding pipe was used to perform continuously an operation of azeotropic separation of an aqueous acrylic acid solution under the following conditions, using methylisobutyl ketone as an azeotropic solvent.

| Composition of feed solution: | |
| Acrylic acid: | 65% by weight |
| $H_2O$: | 32% by weight |
| Acetic acid: | 2% by weight |
| Other impurities: | 1% by weight |
| Quantity of feed flow: | 9000 kg/h |
| Quantity of reflux: | 11000 kg/h |

| -continued | |
|---|---|
| Composition of feed solution: | |
| Column top pressure: | 185 hPa |
| Temperature at 37th stage: | 90° C. |

The perforated trays without downcomer were each divided into 15 segments. In the joining part forming union between two adjacent divided tray segments, a total of 60 holes 12 mm in diameter were formed as illustrated in FIG. 8(b).

The perforated trays without downcomer were each supported by one support beam measuring 75 mm in width as illustrated in FIG. 9 and a support ring measuring 50 mm in width and provided with 73 holes having a diameter of 12 mm as illustrated in FIG. 11. The support beam is provided at the positions overlying the positions of the holes in the perforated tray with 44 holes and at the positions not overlying the perforated tray with 22 holes, each measuring 12 mm in diameter. The number of holes in the perforated trays totaled 8647. The positions of the centers of the holes in the perforated trays without downcomer which approximated closely to the support members were at distances within 10 mm from the inner terminal part of the support ring and at distances within 8 mm from the bends of the divided tray segments and the bends of the support beam.

As polymerization inhibitors, copper dibutyl dithiocarbamate and methoquinone each in a state dissolved in a reflux liquid were supplied at respective concentrations of 45 ppm by weight and 45 ppm by weight (both relative to the quantity of the vapor of acrylic acid) to the interior of the column via the top thereof. Separately, molecular oxygen gas was supplied at a concentration of 0.3% by volume (relative to the quantity of the vapor of acrylic acid) to the bottom of the column.

At this time, the opening ratio (A) found from the standard pitch between the centers of adjacent holes was 31.7%, the opening ratio (B) based on the diameter of a column was 23.5%, and the ratio of the opening ratios (A)/(B) was 1.35.

As a result of using the equipment, the distillate was found to contain acrylic acid at a concentration of 0.1% by weight and acetic acid at a concentration of 0.6% by weight and the extract through the bottom of the column was found to contain acrylic acid at a concentration of 94.9% by weight, acetic acid at a concentration of 2.7% by weight, and methyl isobutyl ketone at a concentration of 70 ppm by weight.

When the interior of the column was inspected after one month's continued operation, virtually no sign of a polymer was detected in the column.

COMPARATIVE EXAMPLE 1

Continuous operation was performed by following the procedure of Example 1 while changing the specifications for the $31^{st}$ through $40^{th}$ perforated trays without downcomer from above to those shown below.

Distance between centers of adjacent holes in perforated trays (pitch): 19.2 mm

No liquid hole in joining part between adjacent divided tray segments

No liquid hole in support beam

Total number of holes in perforated trays: 8448

The positions of the centers of the holes of the perforated tray without downcomer approximated closely to the supporting trays were at distances within 55 mm from the inner terminal parat of the support ring and at distances within 55 mm from the bends of the divided tray segments and the band of the perforated tray.

The opening ratio (A) found from the standard pitch between the centers of the adjacent holes was 35.4% and the ratio of the opening ratios (A)/(B) was 1.54.

As a result of using the equipment, the distillate and the bottom liquid of the column were found to contain the same degrees of acrylic acid and acetic acid and the bottom liquid of the column was found to contain methylisobutyl ketone at a concentration of 260 ppm by weight.

When the interior of the column was inspected after one month's continued operation, the joining part of the perforated trays, the upper side of the support beam, and the upper side of the support ring were found to have formed a polymer in large quantities totaling 26 kg.

The invention claimed is:

1. A perforated tray column without downcomer comprising perforated trays without downcomer, each said tray formed of a plurality of divided tray segments and each tray comprising a plurality of openings having an opening ratio such that opening ratio (A) determined from a standard pitch between the centers of said openings and opening ratio (B) based on the diameter of a column forms a (A)/(B) ratio in the range of 1.1-1.5,
at least one support member for supporting each of said perforated trays without downcomer, wherein a joining part between adjacent said divided tray segments of said perforated trays without downcomer is equipped with notches and/or liquid holes so that a gas or liquid is precluded from channeling or stagnating and the distance between the centers of the openings in the tray immediately adjacent to the at least one support member is within 50 mm of the at least one support member.

2. The perforated tray column without downcomer according to claim 1, wherein said opening ratio (B) is in the range of 10-30% and the diameter of the opening is 10-25 mm.

3. The perforated tray column without downcomer according to claim 1 wherein the at least one support member is provided with holes in such a manner that when the openings of the perforated tray without downcomer are disposed on the at least one support member, the holes in the at least one support member and the openings in the perforated tray without downcomer are overlapped.

4. A method for distillation of an easily polymerizable compound or an easily polymerizable compound-containing liquid, comprising:
providing a perforated tray column without downcomer comprising perforated trays without downcomer, each said tray formed of a plurality of divided tray segments and each tray comprising a plurality of openings having an opening ratio such that opening ratio (A) determined from a standard pitch between the centers of said openings and opening ratio (B) based on the diameter of a column forms a (A)/(B) ratio in the range of 1.1-1.5, a joining part between adjacent said divided tray segments of said perforated tray without downcomer is equipped with notches and/or liquid holes and at least one support member for supporting each of said perforated trays without downcomer and the distance between the centers of the openings in the tray immediately adjacent to the at least one support member is within 50 mm of the at least one support member,
providing an easily polymerizable compound or an easily polymerizable compound-containing liquid; and
distilling the easily polymerizable compound or an easily polymerizable compound-containing liquid using the perforated tray column wherein a gas or liquid is precluded from channeling or stagnating.

5. A perforated tray column without downcomer equipped with perforated trays without downcomer, each tray formed of a plurality of divided tray segments, and each tray comprising a plurality of openings in a regular triangular or quadrangular array having a respective unit triangle or quadrangle, wherein opening ratio (A) of a total surface area of the openings in the unit triangle or quadrangle to a total surface area of the unit triangle or quadrangle area, and opening ratio (B) of a total surface area of the openings in the tray to the cross-sectional area of the column, form a ratio (A)/(B) in the range of 1.1-1.5, a joining part between adjacent divided tray segments is equipped with notches and/or liquid holes wherein a gas or liquid is precluded from channeling or stagnating and at least one support member for supporting each of said perforated trays without downcomer and the distance between the centers of the openings in the tray imniediately adjacent to the at least one support member is within 50 mm of the at least one support member.

6. A perforated tray without downcomer, comprising a plurality of separate tray segments, each tray comprising a plurality of openings in a regular array, said regular array being a regular triangular or quadrangular array having a respective unit triangle or quadrangle, wherein an opening ratio (A) of a total surface area of the openings in the unit tangle or quadrangle, and opening ratio (B) of a total surface area of the openings in the tray of a total surface area of the tray, fonn a ratio (A)/(B) in the range of 1.1-1.5, and regions of overlap between adjoining tray segments are provided with openings in the form of holes or notches wherein a gas or liquid is precluded from channeling or stagnating and at least one support member for supporting each of said perforated trays without downcomer and the distance between the centers of the openings in the tray immediately adjacent to the at least one support member is within 50 mm of the at least one support member.

7. The perforated tray without downcomer according to claim 6, wherein the regular array is an equilateral triangular array, an isosecles triangular array, a square array or a rectangular array.

* * * * *